(12) United States Patent
Tseng et al.

(10) Patent No.: US 9,112,348 B2
(45) Date of Patent: Aug. 18, 2015

(54) ANTI-SURGE OVER-CURRENT PROTECTION DEVICE

(71) Applicants: Chun Teng Tseng, Sanwan Township, Miaoli County (TW); Pin Syuan Li, Hsinchu (TW); Chi Jen Su, New Taipei (TW)

(72) Inventors: Chun Teng Tseng, Sanwan Township, Miaoli County (TW); Pin Syuan Li, Hsinchu (TW); Chi Jen Su, New Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 86 days.

(21) Appl. No.: 14/072,992

(22) Filed: Nov. 6, 2013

(65) Prior Publication Data
US 2015/0124366 A1    May 7, 2015

(30) Foreign Application Priority Data

May 31, 2013   (TW) .............................. 102119274 A

(51) Int. Cl.
*H02H 9/02* (2006.01)
*H01C 7/02* (2006.01)
*H01C 7/13* (2006.01)

(52) U.S. Cl.
CPC .................. *H02H 9/026* (2013.01); *H01C 7/02* (2013.01); *H01C 7/13* (2013.01)

(58) Field of Classification Search
CPC ............. H01C 1/406; H01C 7/02; H01C 7/13
See application file for complete search history.

(56) References Cited

U.S. PATENT DOCUMENTS

| | | | |
|---|---|---|---|
| 7,119,655 B2 * | 10/2006 | Starling et al. .............. | 338/22 R |
| 7,145,431 B2 * | 12/2006 | Han et al. .................... | 338/22 R |
| 2003/0227368 A1 * | 12/2003 | Huang et al. ................ | 338/22 R |
| 2003/0227731 A1 * | 12/2003 | Huang et al. ................ | 361/103 |

FOREIGN PATENT DOCUMENTS

| | | |
|---|---|---|
| EP | 1662515 A1 | 5/2006 |
| TW | 201246238 A | 11/2012 |

* cited by examiner

*Primary Examiner* — Zeev V Kitov
(74) *Attorney, Agent, or Firm* — Egbert Law Offices, PLLC

(57) ABSTRACT

An anti-surge over-current protection device comprises a PTC material layer, first and second conductive layers. The PTC material layer has opposite first and second planar surfaces. The first conductive layer is in physical contact with the first planar surface and comprises a plurality of first conductive members isolated from each other. The second conductive layer is in physical contact with the second planar surface, and comprises a plurality of second conductive members isolated from each other. The first conductive layer, the PTC material layer and the second conductive layer form a circuit containing first and second conductive paths. In the first conductive path, the PTC material layer forms a first series connection resistive component having at least two resistors. In the second conductive path, the PTC material layer forms a second series connection resistive component having at least two resistors.

11 Claims, 5 Drawing Sheets

ANTI-SURGE OVER-CURRENT PROTECTION DEVICE

CROSS-REFERENCE TO RELATED APPLICATIONS

The present application claims priority to Taiwanese Application No. 102119274, filed on May 31, 2013.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to an over-current protection device, and more particularly to an anti-surge over-current protection device.

2. Description of Related Art Including Information Disclosed under 37 CFR 1.97 and 37 CFR 1.98

Anti-surge protection can detect over-voltage event and instantly stop surge voltage, and at the same time cut off the over-voltage power source to protect a relevant system. The protection may be triggered to turn of the power spontaneously if a fluctuation of the power transiently differentiates from a standard value by 10% or more.

In USB applications, surge current may occur due to transient low resistance when hot plugging, and therefore voltage may fluctuate violently. In such circumstance, a traditional positive temperature coefficient (PTC) device may trip to provide over-current protection. However, the PTC device usually responds in several milliseconds and the anti-surge protection apparatus, normally a semiconductor device, can quickly responds in several nanoseconds; therefore the anti-surge protection apparatus would turn off or restart the system before the PTC device activates. Nevertheless, such surge phenomenon is not harmful to electronic devices, and the PTC device is able to protect the electronic devices even if damage to the electronic devices occurs. The unexpected turn-off and restart of the system may incur data loss and inconvenience of waiting for restarting. Although the anti-surge semiconductor device can redesign to overcome this problem, it is costly especially for an apparatus of several USB ports in view of much expensive semiconductor processes.

BRIEF SUMMARY OF THE INVENTION

The present application provides an over-current protection device capable of preventing anti-surge or short-circuit, in which resistors in series connection are employed to increase the resistances of current paths. Accordingly, the amount of surge current can be restricted or diminished. Moreover, the over-current protection device uses multi-port design which takes up less space, so it is advantageous to be applied to a high-end circuit board or mother board with a lot of components, and it is beneficial to design flexibility.

In accordance with the present application, an anti-surge over-current protection device comprises a PTC material layer, a first conductive layer and a second conductive layer. The PTC material layer has opposite first and second planar surfaces. The first conductive layer is in physical contact with the first planar surface and comprises a plurality of first conductive members isolated from each other. The second conductive layer is in physical contact with the second planar surface, and comprises a plurality of second conductive members isolated from each other. The first conductive layer, the PTC material layer and the second conductive layer form a circuit containing first and second conductive paths. In the first conductive path, the PTC material layer forms a first series connection resistive component having at least two resistors. In the second conductive path, the PTC material layer forms a second series connection resistive component having at least two resistors.

In an embodiment, the first conductive members comprise a first current input portion, a first current output portion and a first current transmission portion. The second conductive members comprise a second current input portion, a second current output portion and a second current transmission portion. The first current input portion, the second current transmission portion, the first current output portion and the PTC material layer laminated therebetween form the first conductive path. The second current input portion, the first current transmission portion and the second current output portion and the PTC material layer laminated therebetween form the second conductive path.

In another embodiment, the first conductive members comprise a first current input portion, a first current output portion, a second current input portion and a second current output portion. The second conductive members comprise a first current transmission portion and a second current transmission portion. The first current input portion, the first current transmission portion, the first current output portion and the PTC material layer laminated therebetween form the first conductive path. The second current input portion, the second current transmission portion, the second current output portion and the PTC material layer laminated therebetween form the second conductive path.

In yet another embodiment, the first conductive members comprise a first current input portion, a first current transmission portion, a second current output portion and a second current transmission portion. The second conductive members comprise a third current transmission portion, a fourth current transmission portion, a first current output portion and a second current input portion. The first current input portion, the third current transmission portion, the first current transmission portion, the first current output portion and the PTC material layer laminated therebetween form the first conductive path. The second current input portion, the second current transmission portion, the fourth current transmission portion, the second current output portion and the PTC material layer laminated therebetween form the second conductive path.

The first and second conductive paths contain resistors in series connection to increase entire resistance of the over-current protection device. If surge happens, instantaneous surge current or voltage can effectively decrease to a value different from the standard value by less than 10%. As a result, unnecessarily automatic protection will not activate, so as to prevent the system from unexpected turn-off or restarting.

According to test results, the over-current protection device can restrict surge current, which means surge voltage can be restricted as well. Therefore, the over-current protection device can achieve surge or over-current protection without turn-off or restarting the system when a short circuit occurs.

BRIEF DESCRIPTION OF THE SEVERAL VIEWS OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
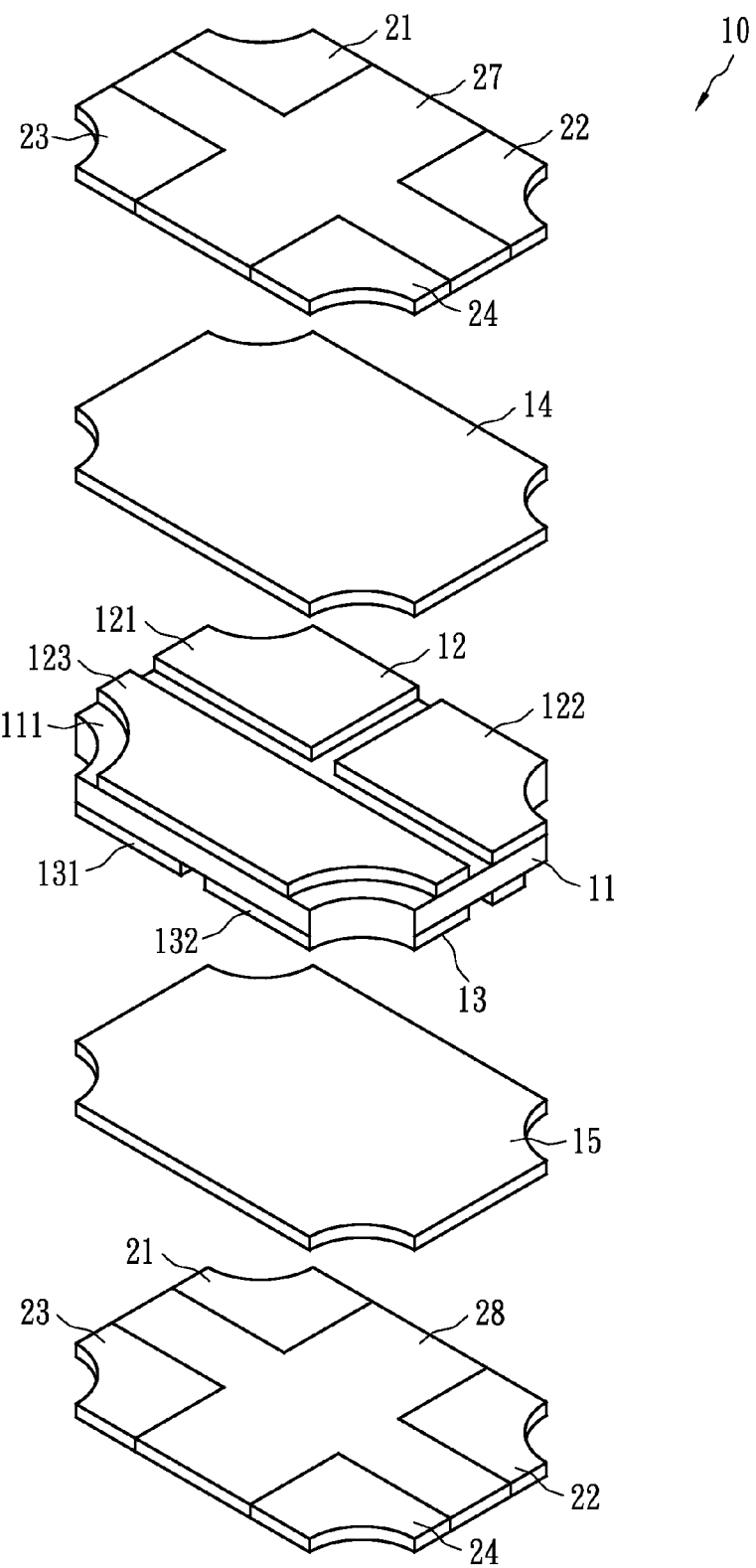
FIGS. 1 to 3 show an anti-surge over-current protection device in accordance with a first embodiment of the present application.
Figure 2:
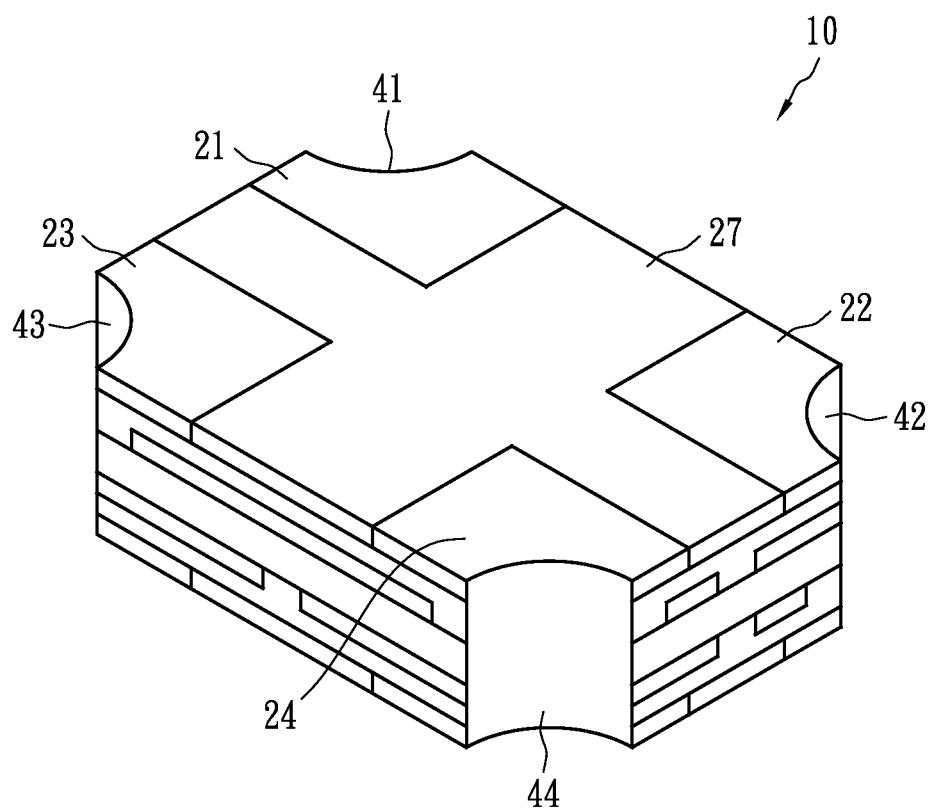
Figure 3:
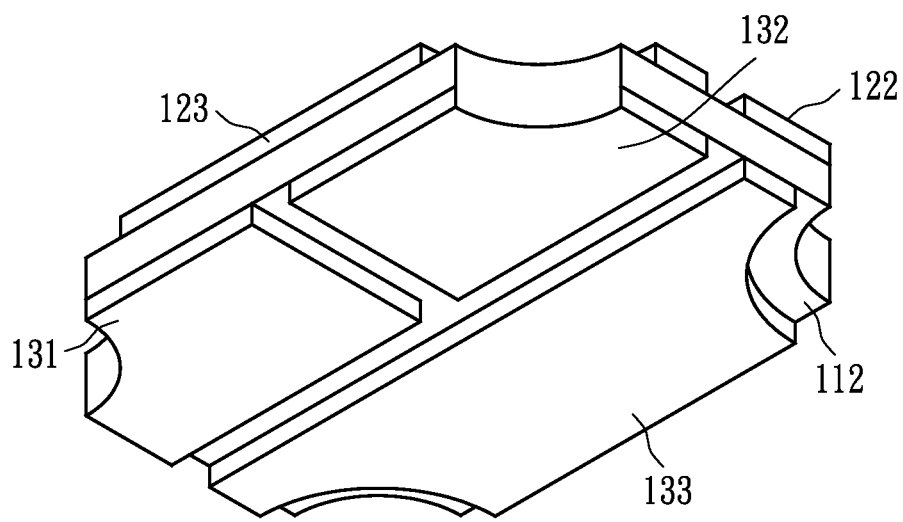
Figure 4:
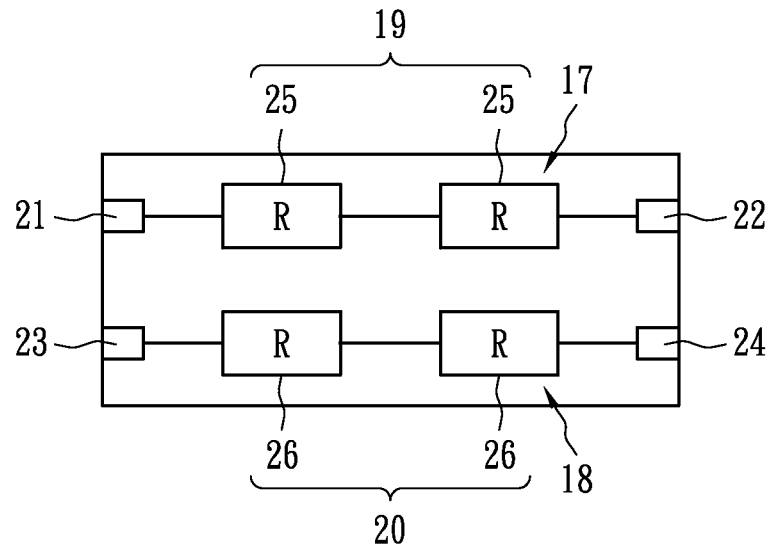
FIG. 4 shows a schematic diagram of the anti-surge over-current protection device in accordance with the first embodiment of the present application.

FIGS. 1 and 2 show an anti-surge over-current protection device in accordance with a first embodiment of the present application, in which FIG. 1 shows the exploded view of the anti-surge over-current protection device. FIG. 3 shows the bottom view of the PTC material layer and upper and lower conductive layers of the anti-surge over-current protection device. FIG. 4 shows schematic diagram of the over-current protection device. An anti-surge over-current protection device 10 comprises a PTC material layer 11, a conductive layer 12, a conductive layer 13, an insulating layer 14, an insulating layer 15, a first electrode 21 a second electrode 22, a third electrode 23 and a fourth electrode 24. The conductive layers 11 and 12 may be copper foils, nickel foils or copper foils plated with nickel. The PTC material layer 11 has opposite first planar surface 111 and second planar surface 112. The conductive layer 12 is in physical contact with the first planar surface 111 and comprises a plurality of first conductive members isolated from each other. The first conductive members comprise a first current input portion 121, a first current output portion 122 and a first current transmission portion 123. The conductive layer 13 is in physical contact with the second planar surface 112 and comprises a plurality of second conductive members. The second conductive members comprise a second current input portion 131, a second current output portion 132 and a second current transmission portion 133. The second current transmission portion 133 overlaps the first current input portion 121 and the first current output portion 122 in vertical direction. The first current transmission portion 123 overlaps the second current input portion 131 and the second current output portion 132 in vertical direction.

The insulting layers 14 and 15 disposed on the conductive layers 12 and 13, respectively. Upper and lower metal electrode layers are formed on the insulating layers 14 and 15. The insulating layers 14 and 15 may comprise prepreg, such as FR4 which is an epoxy material containing fiber glass. When the device undergoes pressing, prepreg can fill into the gaps between the first and second conductive members because of its flowable capability under lamination process. The upper and lower metal electrode layers can be etched to form the electrodes 21, 22, 23 and 24 at four corners of the device 10. Solder masks 27 and 28 may form among the electrodes 21, 22, 23 and 24. The first electrode 21 at upper and lower surfaces may be connected by a conductive connecting member 41 at a corresponding corner, and electrically connects to the first current input portion 121. The second electrode 22 at upper and lower surfaces may be connected by a conductive connecting member 42 at a corresponding corner, and electrically connects to the first current output portion 122. The third electrode 23 at upper and lower surfaces may be connected by a conductive connecting member 43 at a corresponding corner, and electrically connects to the second current input portion 131. The fourth electrode 24 at upper and lower surfaces may be connected by a conductive connecting member 44 at a corresponding corner, and electrically connects to the second current output portion 132. The over-current protection device 10 may serve a surface-mount device (SMD), the electrodes 21, 22, 23 and 24 serve as interfaces for being soldered to a circuit board. The over-current protection device 10 is a substantially rectangular cuboid structure, the conductive connecting members 41, 42, 43 and 44 form at our corners defined by each two adjacent lateral surfaces of the device 10 and extend vertically.

When current flows into the first current input portion 121 through the first electrode 21, it will go through the PTC material layer 1 and thereafter flow to the second current transmission portion 133 overlapped thereunder because the first current input portion 121 is isolated from the first current output portion 122 and the first current transmission portion 123. Then, current again flows through the PTC material layer 11 and flows to the first current output portion 122 overlapping the second current transmission portion 133 in vertical direction. The first current input portion 121, the second current transmission portion 133, the first current output portion 122 and the PTC material layer 11 disposed therebetween form a first conductive path 17. Likewise, the second current input portion 131, the first current transmission portion 123, the second current output portion 132 and the PTC material layer 11 disposed therebetween form a second conductive path 18. In other words, the conductive layer 12, the PTC material layer 11 and the conductive layer 13 form a circuit containing, a first conductive path 17 and a second conductive path 18. The PTC material layer 11 forms a first series connection resistive component 19 in the first conductive path 17, and the first series connection resistive component 19 contains two resistors 25. The PTC material layer 11 forms a second series connection resistive component 20 in the second conductive path 18, and the second series connection resistive component 20 contains two resistors 26.

Figure 5:
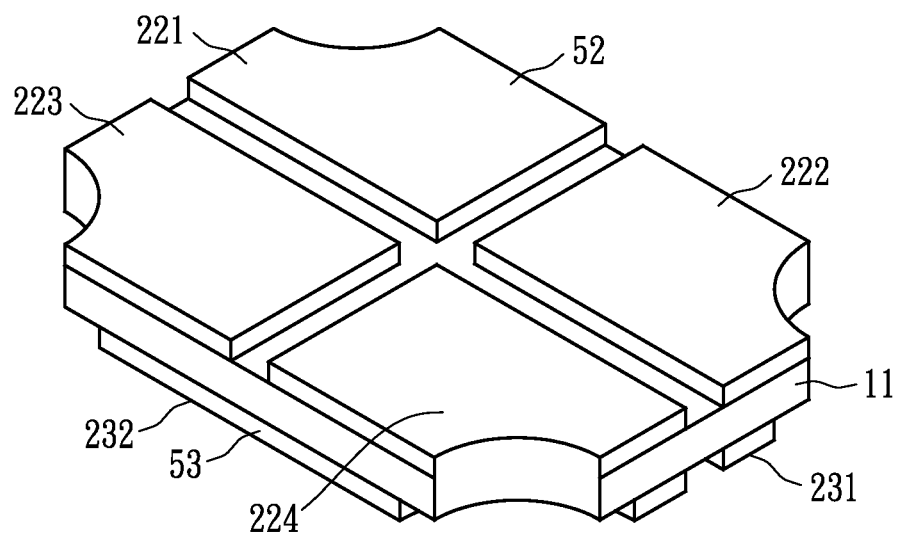
FIGS. 5 and 6 show a combination of the PTC material layer and the conductive layers attached thereon of an anti-surge over-current protection device in accordance with a second embodiment of the present application.
Figure 6:
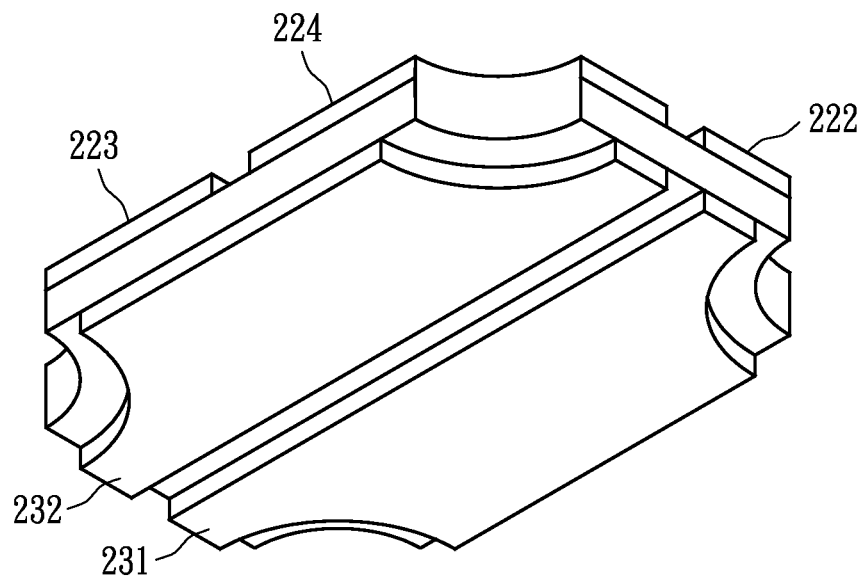

FIGS. 5 and 6 show the combination of the PTC material layer 11 and the conductive layers 52 and 53 attached thereon of an anti-surge over-current protection device m accordance with a second embodiment of the present application. FIG. 5 shows a top view and FIG. 6 shows a bottom view. The conductive layer 52 comprises a plurality of first conductive members isolated from each other. The first conductive members comprise a first current input portion 221, a first current output portion 222, a second current input portion 223 and a second current output portion 224. The conductive layer 53 comprises a plurality of second conductive members isolated from each other. The second conductive members comprise a first current transmission portion 231 and a second current transmission portion 232. The first current transmission portion 231 overlaps the first current input portion 221 and the first current output portion 222 in vertical direction. The second current transmission portion 232 overlaps the second current input portion 223 and the second current output portion 224 in vertical direction. The PTC material layer and the conductive layers 52 and 53 can be associated with insulating layers and electrodes as those shown in FIG. 1 to form a surface-mount over-current protection device. For ease of understanding the structure of the PTC material layer and the conductive layers, the insulating layers and electrodes are not shown in figures.

When current flows into the first current input portion 221, it will go through the PTC material layer 11 and thereafter flow to the first current transmission portion 231 overlapped thereunder because the first current input portion 221 is isolated from the first current output portion 222, the second current input portion 223 and the second current output portion 224. Then, current again flows through the PTC material layer 11 and then flows to the first current output portion 222 overlapping the first current transmission portion 231 in vertical direction. Likewise, when current flows into the second current input portion 223, it will go through the PTC material layer 11 and thereafter flow to the second current transmission portion 232 overlapped, thereunder because the second current input portion 223 is isolated from the first current input portion 221, the first current output portion 222, and the second current output portion 224. Then, current again flows through the PTC material layer 11 and flows to the second current output portion 224 overlapping the second current transmission portion 232.

In the case that the PTC material layer 11 and the conductive layers 52 and 53 are further associated with insulating layers, electrodes and conductive connecting members as those shown in FIG. 1, the schematic diagram may refer to FIG. 4 also. In this embodiment, the first current input portion 221, the first current transmission portion 231, the first current output portion 222 and the PTC material layer 11 laminated therebetween form a first conductive path 17. The second current input portion 223, the second current transmission portion 232, the second current output portion 224 and the PTC material layer 11 laminated therebetween form a second conductive path 18. In other words, the conductive layer 52, the PTC material layer 11 and the conductive layer 53 form a circuit containing a first conductive path 17 and a second conductive path 18. In the first conductive path 17, the PTC material layer 11 forms a first series connection resistive component 19 consisting of two resistors 25. In the second conductive path 18, the PTC material layer 11 forms a second series connection resistive component 20 consisting of two resistors 26.

Figure 7:
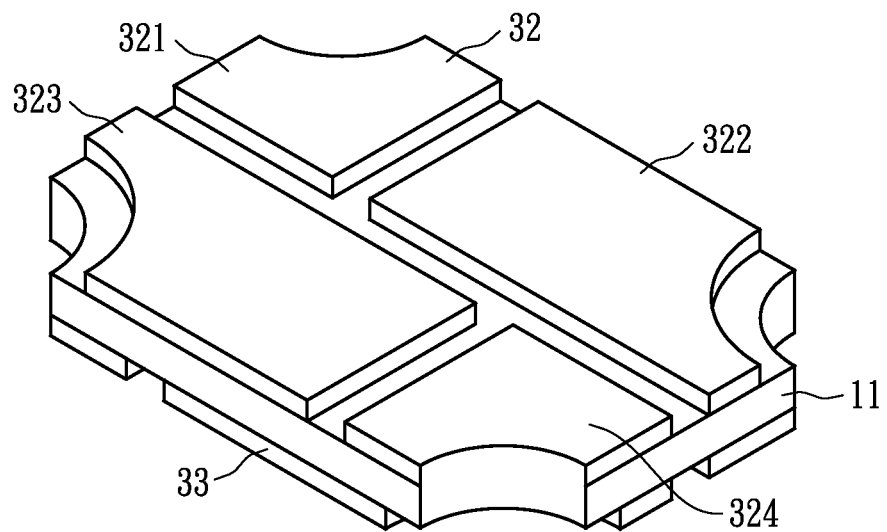
FIGS. 7 and 8 show a combination of the PTC material layer and the conductive layers attached thereon of an anti-surge over-current protection device in accordance with a third embodiment of the present application.
Figure 8:
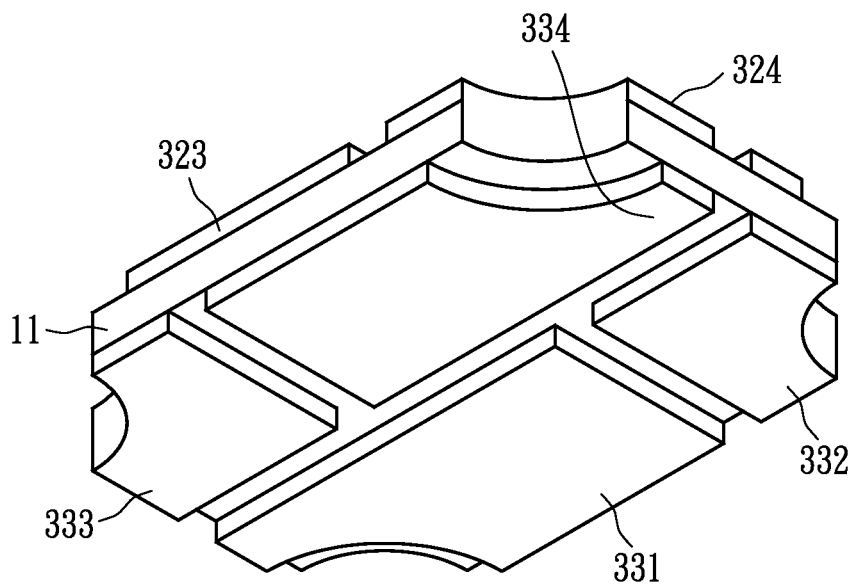

FIGS. 7 and 8 show the combination of the PTC material layer 11 and the conductive layers 32 and 33 attached thereon of an anti-surge aver-current protection device in accordance with a third embodiment of the present application. FIG. 7 shows a top view, and FIG. 8 shows a bottom view. The conductive layer 32 comprises a plurality of first conductive members isolated from each other. The first conductive members comprise a first current input portion 321, a first current transmission portion 322, a second current output portion 324 and a second current transmission portion 323. The conductive layer 33 comprises a plurality of second conductive members isolated from each other. The second conductive members comprise a third current transmission portion 331, a fourth current transmission portion 334, a first current output portion 332 and a second current input portion 333. The first current transmission portion 322 overlaps the first current output portion 332 and the third current transmission portion 331 in vertical direction. The second current transmission portion 323 overlaps the second current input portion 333 and the fourth current transmission portion 334 in vertical direction. The third current transmission portion 331 overlaps the first current input portion 321 and the first current transmission portion 322 in vertical direction. The fourth current transmission portion 334 overlaps the second current output portion 324 and the second current transmission portion 323.

Figure 9:
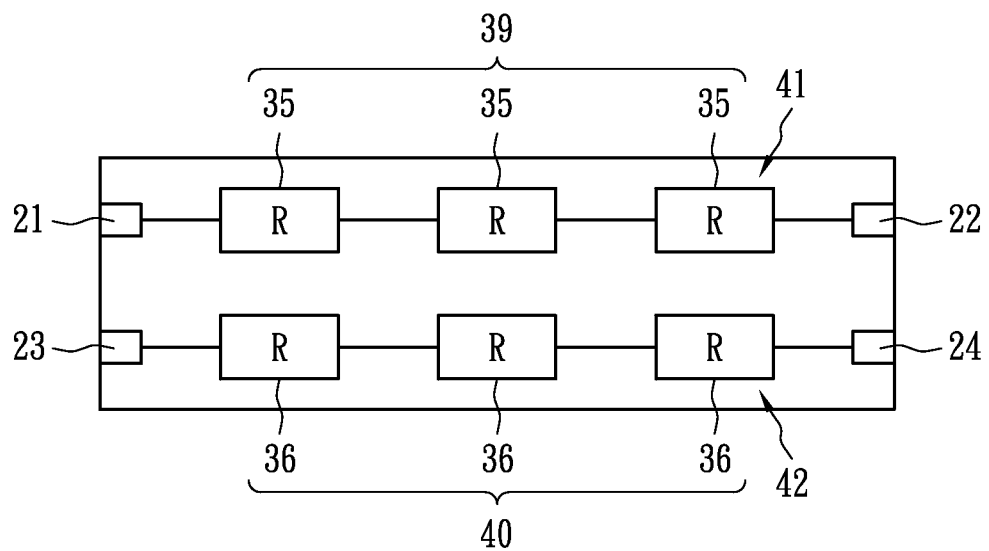
FIG. 9 shows a schematic diagram of the anti-surge over-current protection device in accordance with the third embodiment of the present application.

FIG. 9 shows a schematic diagram of the third embodiment. The first current input portion 321, the third current transmission portion 331, the first current transmission portion 322, the first current output portion 332 and the PTC material layer 11 laminated therebetween form a first conductive path 41. The second current input portion 333 the second current transmission portion 323, the fourth current transmission portion 334, the second current transmission portion 324 and the PTC material layer 11 laminated therebetween form a second conductive path 42. In this embodiment, the PTC material layer 11 in the first conductive path 41 form a first series connection resistive component 39 containing three resistors 35, whereas the PTC material layer 11 in the second conductive path 42 forma second series connection resistive component 40 containing three resistors 36.

The over-current protection devices in accordance with the aforesaid embodiments may comprise plural PTC material layers in series connection, e.g., double PTC material layers illustrated in U.S. Pat. No. 6,377,467, so as to increase hold current of the over-current protection device.

It should be noted that in a single device the PTC material layer and conductive layers form two conductive paths containing series connection resistive components. The application is not limited to surface-mount device. Various electrodes can be used to form axial-leaded or radial-leaded over-current protection devices if desired.

According to the present application, the first and second conductive paths comprise series connection resistive components to increase entire resistance. Consequently, when surge current or surge voltage occurs, instantaneous surge current or voltage can effectively decrease to a value different from the standard value by less than 10%. Therefore, unnecessarily automatic protection will not activate.

The above-described embodiments of the present invention are intended to be illustrative only. Numerous alternative embodiments may be devised by persons skilled in the art without departing from the scope of the following claims.

We claim:

1. An anti-surge over-current protection device; comprising:
   a PTC material layer having opposite first and second planar surfaces;
   a first conductive layer in physical contact with the first planar surface and comprising a plurality of first conductive members isolated from each other; and
   a second conductive layer in physical contact with the second planar surface and comprising a plurality of second conductive members isolated from each other, each of the first and second conductive layers is planar;

wherein the first conductive layer, the PTC material layer and the second conductive layer form a circuit containing a first conductive path and a second conductive path, the PTC material layer in the first conductive path forms a first series connection resistive component having at least two resistors, and the PTC material layer in the second conductive path forms a second series connection resistive component having at least two resistors, the first and second conductive paths being electrically independent, wherein a combination of the plurality of first conductive members and the plurality of second conductive members comprises a current input portion and a current output portion of the first conductive path and a current input portion and a current output portion of the second conductive path.

2. The anti-surge over-current protection device of claim 1, wherein the first conductive members comprise a first current input portion, a first current output portion and a first current transmission portion isolated from each other; the second conductive members comprise a second current input portion, a second current output portion and a second current transmission portion isolated from each other; the first current input portion, the second current transmission portion, the first current output portion and the PTC material layer laminated therebetween form the first conductive path; and the second current input portion, the first current transmission portion and the second current output portion and the PTC material layer laminated therebetween form the second conductive path.

3. The anti-surge over-current protection device of claim 2, wherein the second current transmission portion overlaps the first current input portion and the first current output portion, and the first current transmission portion overlaps the second current input portion and the second current output portion.

4. The anti-surge over-current protection device of claim 2, wherein the first series connection resistive component consists of two resistors, and the second series connection resistive component comprises a pair of resistors.

5. The anti-surge over-current protection device of claim 1, wherein the first conductive members comprise a first current input portion, a first current output portion, a second current input portion and a second current output portion isolated from each other; the second conductive members comprise a first current transmission portion and a second current transmission portion isolated from each other; the first current input portion, the first current transmission portion, the first current output portion and the PTC material layer laminated therebetween form the first conductive path; and the second current input portion, the second current transmission portion and the second current output portion and the PTC material layer laminated therebetween form the second conductive path.

6. The anti-surge over-current protection device of claim 5, wherein the first current transmission portion overlaps the first current input portion and the first current output portion, and the second current transmission portion overlaps the second current input portion and the second current output portion.

7. The anti-surge over-current protection device of claim 1, wherein the first conductive members comprise a first current input portion, a first current transmission portion, a second current output portion and a second current transmission portion isolated from each other; the second conductive members comprise a third current transmission portion, a fourth current transmission portion, a first current output portion and a second current input portion isolated from each other; the first current input portion, the third current transmission portion, the first current transmission portion, the first current output portion and the PTC material layer laminated therebetween form the first conductive path; and the second current input portion, the second current transmission portion, the fourth transmission portion and the second current output portion and the PTC material layer laminated therebetween form the second conductive path.

8. The anti-surge over-current protection device of claim 7, wherein the first current transmission portion overlaps the first current output portion and the third current transmission portion; the second current transmission portion overlaps the second current input portion and the fourth current transmission portion; the third current transmission portion overlaps the first current input portion and the first current transmission portion; and the fourth current transmission portion overlaps the second current output portion and the second current transmission portion.

9. The anti-surge over-current protection device of claim 7, wherein the first series connection resistive component consists of three resistors, and the second series connection resistive component consists of three resistors.

10. The anti-surge over-current protection device of claim 1, further comprising:
a first electrode electrically connecting to the current input portion of the first conductive path;
a second electrode electrically connecting to the current output portion of the first conductive path;
a third electrode electrically connecting to the current input portion of the second conductive path; and
a fourth electrode electrically connecting to the current output portion of the second conductive path;
wherein the first electrode, the second electrode, the third electrode and the fourth electrode serve as interfaces for being soldered to a circuit board.

11. The anti-surge over-current protection device of claim 10, further comprising:
a first conductive connecting member connecting to the first electrode and the current input portion of the first conductive path;
a second conductive connecting member connecting to the second electrode and the current output portion of the first conductive path;
a third conductive connecting member connecting to the third electrode and the current input portion of the second conductive path; and
a fourth conductive connecting member connecting to the fourth electrode and the current output portion of the second conductive path;
wherein the over-current protection device is a substantially rectangular cuboid, the first, second, third and fourth conductive connecting members extend in a vertical direction and are formed at corners defined by adjacent lateral surfaces of the rectangular cuboid.

* * * * *